(12) United States Patent
Garcia Ordonez et al.

(10) Patent No.: US 10,715,303 B2
(45) Date of Patent: Jul. 14, 2020

(54) APPARATUS AND A METHOD FOR MANAGING FULL-DUPLEX COMMUNICATION BETWEEN A BASE STATION AND A PLURALITY OF USER EQUIPMENTS

(71) Applicant: HUAWEI TECHNOLOGIES CO., LTD., Shenzhen, Guangdong (CN)

(72) Inventors: Luis Garcia Ordonez, Boulogne Billancourt (FR); Melissa Duarte Gelvez, Boulogne Billancourt (FR); Merouane Debbah, Boulogne Billancourt (FR); Maxime Guillaud, Boulogne Billancourt (FR)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 40 days.

(21) Appl. No.: 16/045,340

(22) Filed: Jul. 25, 2018

(65) Prior Publication Data
US 2018/0359076 A1    Dec. 13, 2018

Related U.S. Application Data

(63) Continuation of application No. PCT/EP2016/051504, filed on Jan. 26, 2016.

(51) Int. Cl.
*H04L 5/14* (2006.01)
*H04B 7/0456* (2017.01)
(Continued)

(52) U.S. Cl.
CPC ............ *H04L 5/14* (2013.01); *H04B 7/0456* (2013.01); *H04B 17/345* (2015.01); *H04L 5/143* (2013.01); *H04L 5/0073* (2013.01)

(58) Field of Classification Search
CPC ......... H04L 5/14; H04L 5/143; H04L 5/0073; H04L 5/0058; H04B 7/0456; H04B 17/345
(Continued)

(56) References Cited

U.S. PATENT DOCUMENTS

2009/0268684 A1* 10/2009 Lott ................... H04W 72/087
                                                              370/329
2011/0038436 A1*  2/2011 Kim ...................... H04B 7/024
                                                              375/260
(Continued)

FOREIGN PATENT DOCUMENTS

CN    101882965 A    11/2010
CN    104735789 A     6/2015
(Continued)

OTHER PUBLICATIONS

Bei Yin et al., "Full-Duplex in Large-Scale Wireless Systems," XP032593086, Asilomar 2013, pp. 1623-1627.
(Continued)

*Primary Examiner* — Rownak Islam
(74) *Attorney, Agent, or Firm* — Womble Bond Dickinson (US) LLP

(57) ABSTRACT

The invention relates to an apparatus (301) for managing full-duplex communication between a base station ($BS_0$) and a set of user equipments (101a,b), the base station ($BS_0$) comprising a plurality of transmitter antennas, the plurality of transmitter antennas being associated with a downlink communication channel H between the base station ($BS_0$) and the set of user equipments (101a,b) and a plurality of interference channels $G_i$ between the base station ($BS_0$) and a plurality of neighboring base stations ($BS_i$).

14 Claims, 11 Drawing Sheets

(51) Int. Cl.
*H04B 17/345* (2015.01)
*H04L 5/00* (2006.01)

(58) Field of Classification Search
USPC .................................... 370/276, 278, 280
See application file for complete search history.

(56) References Cited

U.S. PATENT DOCUMENTS

| | | | | |
|---|---|---|---|---|
| 2012/0163487 | A1* | 6/2012 | Koyanagi | H04B 7/0634 375/267 |
| 2013/0267241 | A1* | 10/2013 | Baek | H04W 72/087 455/452.2 |
| 2015/0029906 | A1* | 1/2015 | Jana | H04L 5/0073 370/278 |
| 2015/0078186 | A1 | 3/2015 | Lagen Morancho et al. | |
| 2015/0358133 | A1 | 12/2015 | Kusashima et al. | |
| 2017/0149549 | A1* | 5/2017 | Wang | H04L 25/03 |
| 2017/0207863 | A1* | 7/2017 | Shariat | H04B 17/336 |

FOREIGN PATENT DOCUMENTS

| | | |
|---|---|---|
| CN | 104919878 A | 9/2015 |
| CN | 105007248 A | 10/2015 |
| WO | 2006048037 A1 | 5/2006 |
| WO | 2015134907 A1 | 9/2015 |

OTHER PUBLICATIONS

Z. Shen et al., "Dynamic Uplink-Downlink Configuration and Interference Management in TD-LTE," IEEE Communications Magazine, Nov. 2012, pp. 51-59.

S. Goyal et al., "Full Duplex Cellular Systems: Will Doubling Interference Prevent Doubling Capacity?," IEEE Communications Magazine, May 2015, pp. 121-127.

Y. S. Choi et al., "Simultaneous Transmission and Reception: Algorithm, Design and System Level Performance," IEEE Transactions on Wireless Communications, vol. 12, No. 12, Dec. 2013, pp. 5992-6010.

K. I. Pedersen et al., "eICIC Functionality and Performance for LTE HetNet Co-Channel Deployments," 2012 IEEE (5 pp.).

T. Novlan et al., "Comparison of Fractional Frequency Reuse Approaches in the OFDMA Cellular Downlink," 2010 IEEE (5 pp.).

H. Q. Ngo et al., "Multipair Full-Duplex Relaying with Massive Arrays and Linear Processing," May 5, 2014, IEEE International Conference on Communications (15 pp.).

F. Rusek et al., "Scaling up MIMO: Opportunities and challenges with very large arrays," IEEE Signal Processing Magazine, Jan. 2013, pp. 40-60.

E. G. Larsson et al., "Massive MIMO for Next Generation Wireless Systems", IEEE Communications Magazine, Feb. 2014, pp. 186-195.

Xiang Gao et al., "Linear pre-coding performance in measured very-large MIMO channels," 2011 IEEE (5 pp.).

Jakob Hoydis et al., "Channel Measurements for Large Antenna Arrays," 2012 IEEE, pp. 811-815.

Jakob Hoydis et al., "Making Smart Use of Excess Antennas: Massive MIMO, Small Cells, and TDD," Bell Labs Technical Journal 18(2), 2013, pp. 5-21.

A. Sabharwal, et al., "In-Band Full-Duplex Wireless: Challenges and Opportunities," May 20, 2014, pp. 1-22.

4G Americas, "4G Americas' Recommendations on 5G Requirements and Solutions," Oct. 2014 (40 pp.).

3GPP, "Evolved Universal Terrestrial Radio Access (E-UTRA) and Evolved Universal Terrestrial Radio Access Network (E-UTRAN); Overall Description; Stage 2 (3GPP TS 36.300 version 10.4.0 Release 10)," ETSI TS 136 300 V10.4.0, Jun. 2011. pp. 1-207.

Huawei, "Further Analysis of Soft Frequency Reuse Scheme," 3GPP TSG RAN WG1#42, R1-050841, London, UK, Aug. 29-Sep. 2, 2005 (6 pp.).

E. Everett et al., "Passive Self-Interference Suppression for Full-Duplex Infrastructure Nodes," Dec. 17, 2013, pp. 1-16.

E. Everett et al., "Measurement-driven Evaluation of All-digital Many-antenna Full-duplex Communication," Aug. 15, 2015, pp. 1-15.

3GPP, 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11), 3GPP TR 36.828 V11.0.0 (Jun. 2012), pp. 1-109.

International Search Report, dated Sep. 26, 2016, in International Application No. PCT/EP2016/051504 (6 pp.).

Written Opinion of the International Searching Authority, dated Sep. 26, 2016, in International Application No. PCT/EP2016/051504 (7 pp.).

International Search Report dated Sep. 26, 2016 in corresponding International Patent Application No. PCT/EP2016/051504.

* cited by examiner

APPARATUS AND A METHOD FOR MANAGING FULL-DUPLEX COMMUNICATION BETWEEN A BASE STATION AND A PLURALITY OF USER EQUIPMENTS

CROSS-REFERENCE TO RELATED APPLICATIONS

This application is a continuation of International Application No. PCT/EP2016/051504, filed on Jan. 26, 2016, the disclosure of which is hereby incorporated by reference in its entirety.

TECHNICAL FIELD

Generally, the present invention relates to the field of telecommunications. More specifically, the present invention relates to an apparatus and a method for managing full-duplex communication between a base station and a plurality of user equipments.

BACKGROUND

Due to the potential gains in spectral efficiency that can be achieved through simultaneous uplink (UL) and downlink (DL) communication within the entire frequency band, in-band full-duplex, also known as full-duplex (FD), is a promising candidate technology for next generation wireless communication systems. Commonly used half-duplex (HD) systems, such as time division duplex (TDD) or frequency division duplex (FDD) systems, employ orthogonal time resources or orthogonal frequency resources, respectively. A full-duplex BS can improve the spectral efficiency because it uses the same time and frequency resources for uplink and downlink simultaneously. FIG. 1 shows an exemplary communication system 100 including two full-duplex base stations $BS_0$ and $BS_1$ simultaneously using the same time and frequency resources for uplink and downlink communication with user equipments 101a, b and user equipments 101c, d, respectively.

Thus, enabling full-duplex base stations can potentially double the spectral efficiency at the cell. However, the simultaneous transmission and reception in full-duplex base stations gives rise to a new interference scenario, e.g., inter-cell interference between neighboring co-channel base stations and self-interference at a single base station. Examples of inter-cell interference and self-interference are shown in FIG. 1 for the case of a communication system 100 with two BSs and in FIG. 2 for a more general case of a communication system 200 with seven BSs.

In currently deployed wireless systems, co-channel base stations are typically synchronized such that all cells use the same uplink-downlink configuration with the transmission direction (either uplink or downlink) in all cells being time aligned. The main reason for a synchronous operation is that the usage of opposite transmission directions in neighboring co-channel cells would result in strong base station to base station interference (Z. Shen, A. Khoryaev, E. Eriksson and X. Pan, "Dynamic uplink-downlink configuration and interference management in TD-LTE", IEEE Communications Magazine, November 2012). Consequently, inter-cell interference and the self-interference can be avoided in half-duplex networks by using an appropriate time and/or frequency slot assignment. This is not the case in full-duplex BS deployments, because simultaneous co-channel uplink and downlink transmissions in all base stations are the essence of the full-duplex operation. In consequence, the self-interference and the base station to base station inter-cell interference must be explicitly addressed in order to enable full-duplex networks and leverage the potential increase of spectral efficiency (S. Goyal, P. Liu, S. S Panwar, R. A. DiFazio, R. Yang, and E. Bala "Full duplex cellular systems: Will doubling interference prevent doubling capacity?", IEEE Communications Magazine, May 2015 and Y. S. Choi and H. Shirani-Mehr "Simultaneous Transmission and Reception: Algorithm, Design and System Level Performance", IEEE Transactions on Wireless Communications, December 2013).

Current solutions for interference mitigation in half-duplex systems have disadvantages when applied to the full-duplex scenario. For example, if one applies an Almost Blank Subframe (ABS) solution like the one proposed in LTE (K. I. Pedersen, Y. Wang, B. Soret and F. Frederiksen, "eICIC functionality and performance for LTE HetNet co-channel deployments", in Proc. IEEE Vehicular Technology Conference Fall, 2012), where a set of the interfering nodes remains silent during a period of time, the full-duplex configuration ends up being reverted (completely or partially) to a half-duplex configuration hence losing some or all of the full-duplex gain. Similarly, solutions like frequency reuse or fractional frequency reuse as disclosed, for instance, in T. Novlan, J. G. Andrews, I. Sohn, R. K. Ganti and A. Ghosh, "Comparison of fractional frequency reuse approaches in the OFDMA cellular downlink", in Proc. IEEE Global Telecommunication Conference, 2010, which do an orthogonal frequency assignment to regions that suffer from interference, end up reverting the full-duplex assignment (completely or partially) to a half-duplex one.

Conventional full-duplex solutions mainly consider the problem of self-interference cancellation while disregarding the problem of inter-cell interference. The self-interference received at a full-duplex base station is due to the received signal from its own transmissions, whereas the inter-cell interference is due to the received signal from the transmissions of neighboring co-channel base stations. In the case of multiple antenna full-duplex base stations, the use of large number of antennas has only been leveraged for reducing the self-interference, i.e., for achieving spatial self-interference cancellation (B. Yin, M. Studer, J. R. Cavallaro and J. Lilleberg, "Full-duplex in large-scale wireless systems", in Proc. Asilomar Conference on Signal Systems and Computers, November 2013 and H. Q. Ngo, H. A. Surawera, M. Matthaiou and E. G. Larsson, "Multipair full-duplex relaying with massive arrays and linear processing," available online http://arxiv.org/abs/1405.1063).

Generally, conventional spatial self-interference cancelling solutions implicitly assume that the size of the antenna array is larger than the number of users to be served in the cell plus the number of independent self-interference signals to be cancelled. This premise, however, does not usually hold for the case of inter-cell interference. This is because the number of co-channel neighboring base stations' antennas and, thus, the number of independent interfering directions to be cancelled is very high and can potentially increase with the size of the base stations arrays. Hence, extending the self-interference cancellation solutions disclosed in the above-referenced papers by Yin et al. and Ngo et al. for simultaneously solving the self-interference and the inter-cell interference problems is difficult. Indeed, the case when the number of degrees of freedom provided by the large scale multi antenna configuration is smaller than the number required for interference nulling between full-duplex base stations has not been considered. In such a case, the base station DL precoder must consider the tradeoff between serving its DL users and minimizing the self-interference and inter-cell interference.

Massive MIMO technology uses antenna arrays with the number of antenna elements being some orders of magnitude larger than current state-of-the-art MIMO technology, say 100 antennas or more (F. Rusek, D. Persson, B. K. Lau, E. G. Larsson, T. L. Marzetta, O. Edfors, and F. Tufvesson, "Scaling up MIMO: Opportunities and challenges with very large arrays", IEEE Signal Processing Magazine, January 2013 and E. G. Larsson, F. Tufvesson, O. Edfors, and T. L. Marzetta, "Massive MIMO for Next Generation Wireless Systems", IEEE Communications Magazine, February 2014). Reaping the benefits of massive MIMO technology requires the channels of the active users to be nearly orthogonal or very low correlated. Real channel measurements campaigns reported in Xiang Gao; Edfors, O.; Rusek, F.; Tufvesson, F., "Linear Pre-Coding Performance in Measured Very-Large MIMO Channels," in Vehicular Technology Conference (VTC Fall), 2011 IEEE, vol., no., pp. 1-5, 5-8 Sep. 2011 and Hoydis, J.; Hoek, C.; Wild, T.; ten Brink, S., "Channel measurements for large antenna arrays," in Wireless Communication Systems (ISWCS), 2012 International Symposium on, vol., no., pp. 811-815, 28-31 Aug. 2012 indicate that channel correlation cannot be arbitrarily reduced by increasing the number of antennas, which means that usual propagation environments offer a limited number of physical directions or degrees of freedom. Hence, the number of users that can be effectively served within a cell is limited (around 20 as reported in Hoydis et al. 2012) independently of the number of antennas at the massive MIMO base station (typically larger than 100). This leads to the concept of excess antennas. The number of excess antennas is given by the number of transmit antennas minus the number of active DL users.

The use of excess antennas in a massive MIMO base station to mitigate the inter-cell interference has been considered in J. Hoydis, K. Hosseni, S. T. Brink and M. Debbah, "Making smart use of excess antennas: Massive MIMO, small cells, and TDD", Bell Labs Technical Journal 18(2), 5-21, 2013 in the context of HD two-tier heterogeneous networks. However, the solutions provided in Hoydis et al. 2013 hold only for the case where all of the antennas in the array are either in transmitter mode or in receiver mode. Hence, the solutions provided in Hoydis et al. 2013 apply only to a half-duplex scenario.

In the light of the above, there is a need for an improved apparatus and method for managing full-duplex communication between a base station and a plurality of user equipments allowing the base station to serve the plurality of user equipments while mitigating the inter-cell interference that the base station generates at neighboring full-duplex base stations.

SUMMARY

It is an object of the invention to provide an improved apparatus and method for managing full-duplex communication between a base station and a plurality of user equipments allowing the base station to serve the plurality of user equipments while mitigating the inter-cell interference that the base station generates at neighboring full-duplex base stations.

The foregoing and other objects are achieved by the subject matter of the independent claims. Further implementation forms are apparent from the dependent claims, the description and the figures.

According to a first aspect, the invention relates to an apparatus for managing full-duplex communication between a base station and a set of user equipments, the base station comprising a plurality of transmitter antennas and a plurality of receiver antennas, the plurality of transmitter antennas being associated with a downlink communication channel H between the base station and the set of user equipments and a plurality of interference channels $G_i$ between the base station and a plurality of receiver antennas of a plurality of neighboring base stations, the apparatus comprising: a determiner configured to determine an aggregate interference channel G on the basis of the plurality of interference channels $G_i$; a modifier configured to iteratively modify the aggregate interference channel G to obtain a modified aggregate interference channel F under the constraint that a performance measure depending on the downlink communication channel H and the modified aggregate interference channel F meets a performance measure criterion, wherein the modified aggregate interference channel F spans a subspace of the space spanned by the aggregate interference channel G; and a precoder (307) configured to precode signals to be transmitted by the plurality of transmitter antennas on the basis of a precoder matrix W, in order to mitigate the interference at least at some of the neighboring base stations, wherein the precoder matrix W depends on the modified aggregate interference channel F.

Thus, an improved apparatus for managing full-duplex communication between a base station and a plurality of user equipments is provided, which allows the base station to serve the plurality of user equipments while mitigating the inter-cell interference that the base station generates at neighboring full-duplex base stations.

In a first possible implementation form of the apparatus according to the first aspect as such, the determiner is configured to determine the aggregate interference channel G on the basis of the plurality of interference channels $G_i$ and a self-interference channel $G_0$ between the plurality of transmitter antennas and a plurality of receiver antennas of the base station.

In a second possible implementation form of the apparatus according to the first aspect as such or the first implementation form thereof, the modifier is configured to modify the aggregate interference channel G to obtain the modified aggregate interference channel F under the constraint that a performance measure depending on the downlink communication channel H and the modified aggregate interference channel F meets a performance measure criterion by removing at least one column or row of the aggregate interference channel G that is the most aligned to the space spanned by the downlink communication channel H.

In a third possible implementation form of the apparatus according to the first aspect as such or the first or second implementation form thereof, the precoder is a regularized zero-forcing precoder, wherein the zero-forcing precoder is configured to adjust the degree of orthogonality to the space spanned by the modified aggregate interference channel F on the basis of a parameter associated with noise and/or interference level.

In a fourth possible implementation form of the apparatus according to the first aspect as such or any one of the first to third implementation form thereof, the precoder matrix W depends on the modified aggregate interference channel F in such a way that the space spanned by the precoder matrix W is orthogonal to the space spanned by the modified aggregate interference channel F.

Thus, in an implementation form the precoder matrix W can be defined by the following equation:

$$W = \kappa \, \text{pinv}(H(I - F^H \text{pinv}(FF^H)F)),$$

wherein $\kappa$ denotes a pre-definable constant for adjusting the desired transmit power, pinv(A) denotes the pseudoinverse of the matrix A, I denotes the identity matrix and $F^H$ denotes the Hermitian transpose of the modified aggregate interference channel F.

In a fifth possible implementation form of the apparatus according to the first aspect as such or any one of the first to fourth implementation form thereof, the performance measure criterion comprises a performance measure criterion for each user equipment of the set of user equipments, wherein each performance measure criterion is defined by the following equation:

$$\text{QoS}_k(HW) \geq \gamma_k,$$

wherein $\text{QoS}_k$ denotes a performance measure and $\gamma_k$ denotes a performance measure threshold for the k-th user equipment of the set of user equipments.

In an implementation form, the performance measure can be a signal-to-interference-plus-noise ratio or a throughput defined as the effective downlink transmission rate between the base station and a user equipment.

In a sixth possible implementation form of the apparatus according to the first aspect as such or any one of the first to fifth implementation form thereof, the modifier is configured to modify the aggregate interference channel G to obtain the modified aggregate interference channel F by determining a singular value decomposition of the aggregate interference channel G of the form $G = U \Lambda V^H$ comprising a diagonal matrix $\Lambda$, modifying at least one of the singular values of the diagonal matrix $\Lambda$ to obtain a modified diagonal matrix $\Lambda^*$, and by determining the modified aggregate interference channel F as $F = U \Lambda^* V^H$.

In a seventh possible implementation form of the apparatus according to the first aspect as such or any one of the first to sixth implementation form thereof, the modifier is configured to modify the aggregate interference channel G to obtain a modified aggregate interference channel F on the basis of information provided by at least one neighboring base station of the plurality of neighboring base stations.

In an eighth possible implementation form of the apparatus according to the seventh implementation form of the first aspect, the information provided by the at least one neighboring base station of the plurality of neighboring base stations comprises information identifying at least one receiver antenna of at least one neighboring base station of the plurality of neighboring base stations for which interference should be mitigated.

In a ninth possible implementation form of the apparatus according to the eighth implementation form of the first aspect, the modifier is configured to modify the aggregate interference channel G to obtain the modified aggregate interference channel F by removing a row or column of the aggregate interference channel G associated with the identified receiver antenna of the at least one neighboring base station of the plurality of neighboring base stations for which interference should be mitigated.

In a tenth possible implementation form of the apparatus according to the first aspect as such or any one of the first to ninth implementation form thereof, the apparatus further comprises a scheduler configured to adjust the set of user equipments served by the base station on the basis of the modified aggregate interference channel F and/or the precoder matrix W.

In an eleventh possible implementation form of the apparatus according to the first aspect as such or any one of the first to tenth implementation form thereof, the apparatus is configured to provide information about the modified aggregate interference channel F to at least one neighboring base station of the plurality of neighboring base stations allowing the at least one neighboring base station, in particular, to reschedule its uplink users equipments.

According to a second aspect, the invention relates to a base station comprising an apparatus according to the first aspect as such or any one of the first to eleventh implementation form thereof.

According to a third aspect, the invention relates to a method for managing full-duplex communication between a base station and a set of user equipments, the base station comprising a plurality of transmitter antennas and a plurality of receiver antennas, the plurality of transmitter antennas being associated with a downlink communication channel H between the base station and the set of user equipments and a plurality of interference channels $G_i$ between the base station and a plurality of receiver antennas of a plurality of neighboring base stations, the method comprising the steps of: determining an aggregate interference channel G on the basis of the plurality of interference channels $G_i$; modifying the aggregate interference channel G to obtain a modified aggregate interference channel F under the constraint that a performance measure depending on the downlink communication channel H and the modified aggregate interference channel F meets a performance measure criterion, wherein the modified aggregate interference channel F spans a subspace of the space spanned by the aggregate interference channel G; and precoding signals to be transmitted by the plurality of transmitter antennas on the basis of a precoder matrix W in order to mitigate the interference at least at some of the neighboring base stations, wherein the precoder matrix W depends on the modified aggregate interference channel F.

The method according to the third aspect of the invention can be performed by the apparatus according to the first aspect of the invention. Further features of the method according to the third aspect of the invention result directly from the functionality of the apparatus according to the first aspect of the invention and its different implementation forms described above.

According to a fourth aspect the invention relates to a computer program comprising program code for performing the method according to the third aspect of the invention or any of its implementation forms when executed on a computer.

The invention can be implemented in hardware and/or software.

BRIEF DESCRIPTION OF THE DRAWINGS

Further embodiments of the invention will be described with respect to the following figures, wherein.

In the various figures, identical reference signs are used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
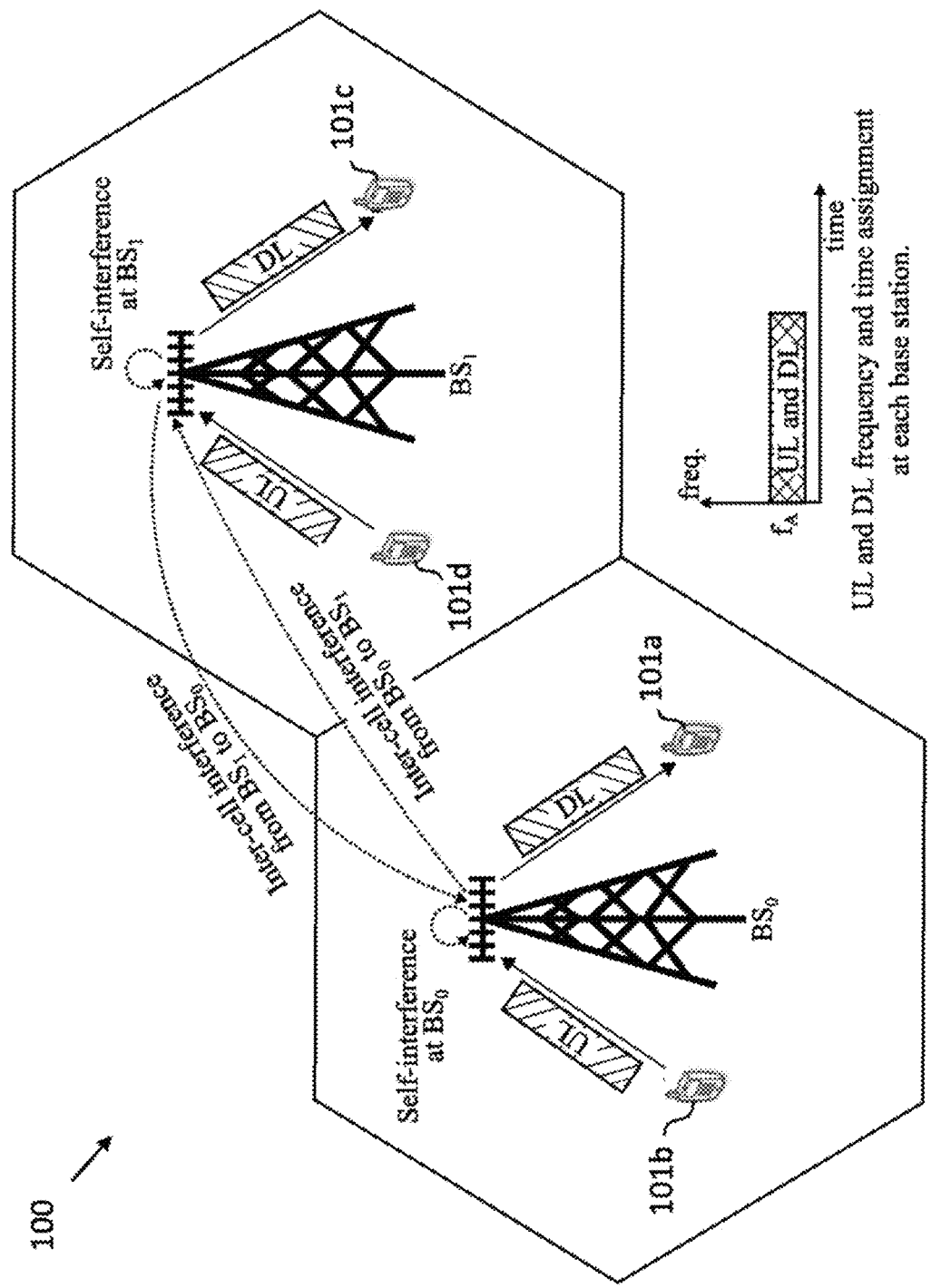
FIG. 1 shows a schematic diagram of a communication system comprising a plurality of base stations and a plurality of user equipments.
Figure 2:
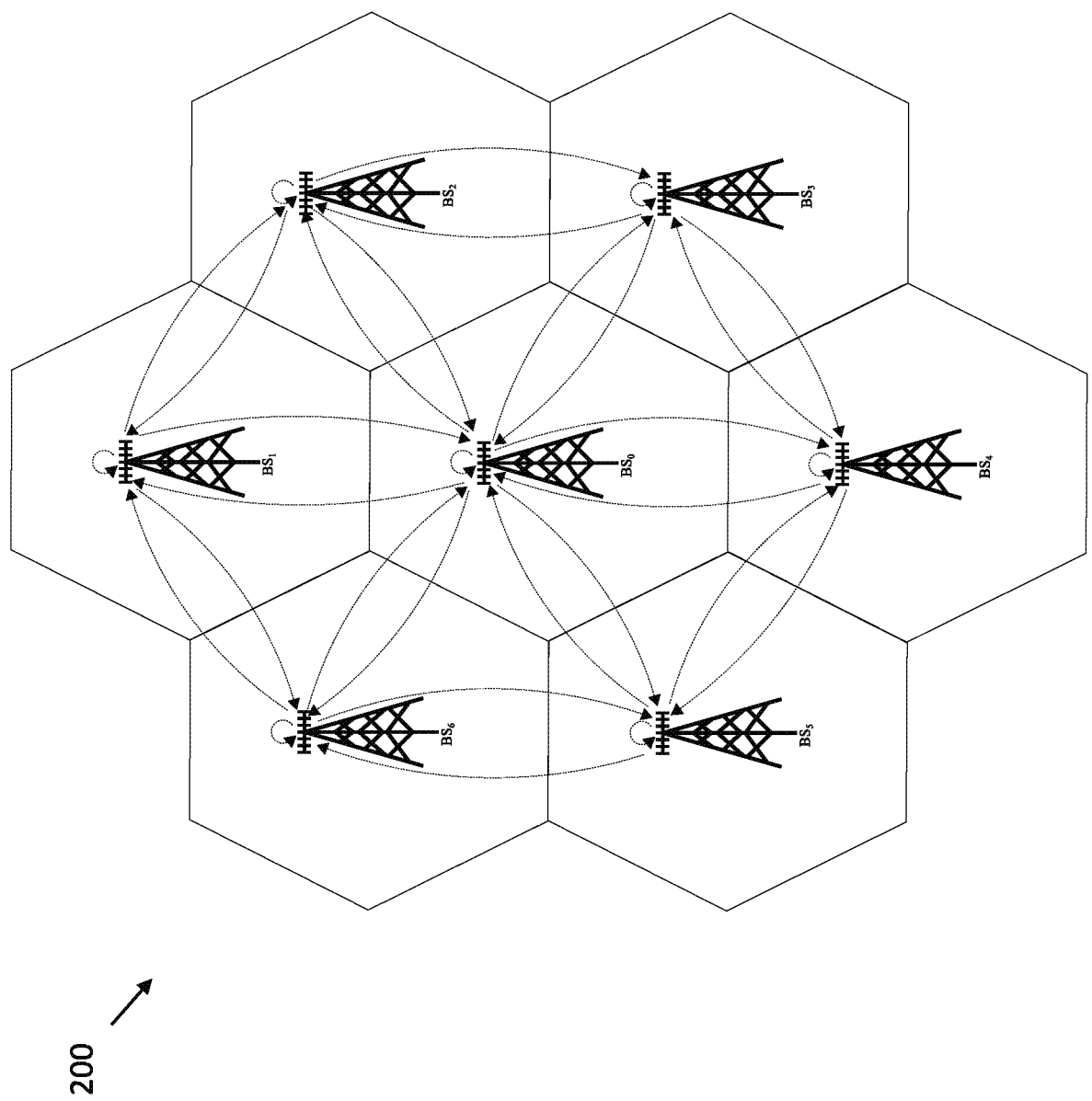
FIG. 2 shows a schematic diagram of a communication system comprising a plurality of base stations.
Figure 3:
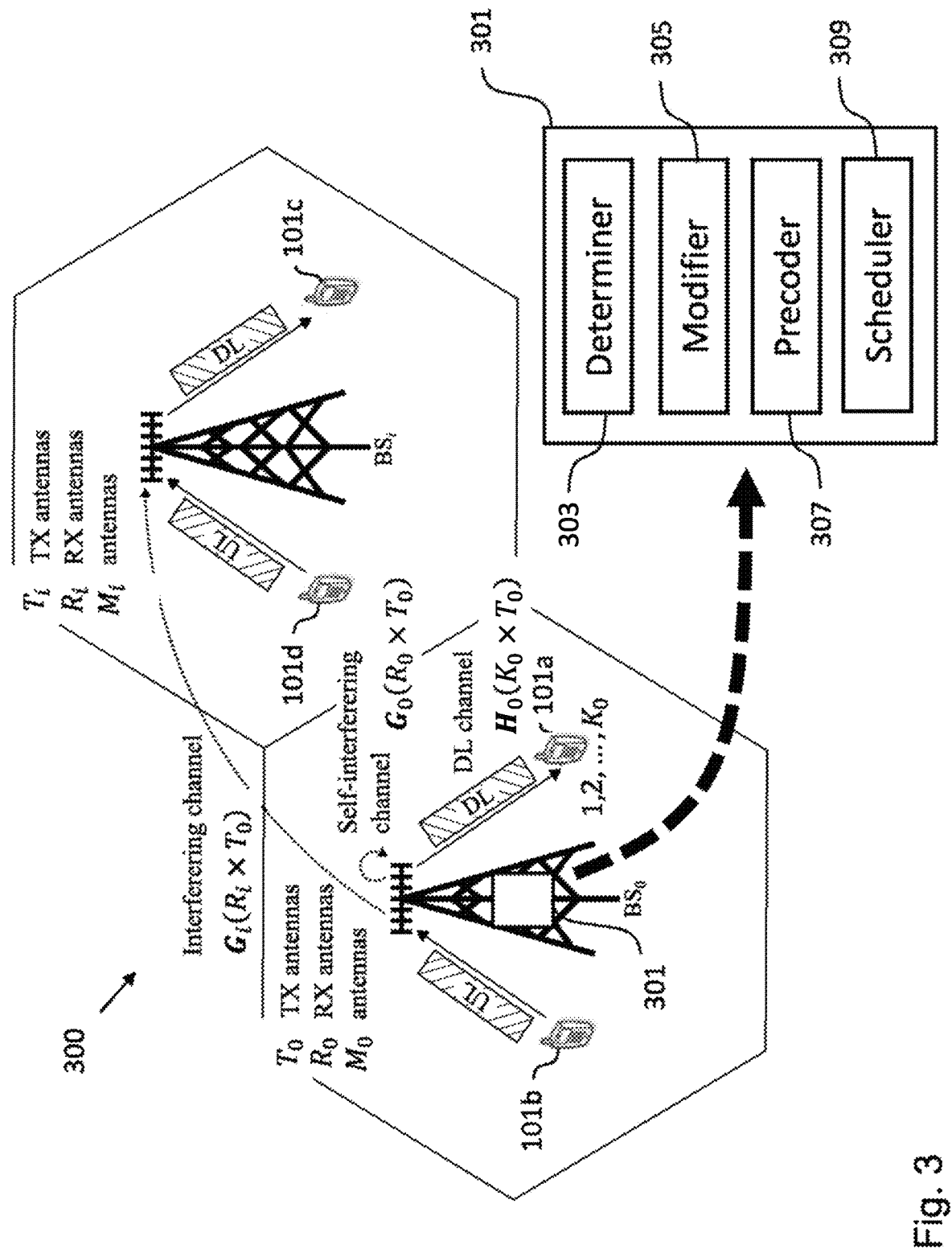
FIG. 3 shows a schematic diagram of an apparatus for managing full-duplex communication between a base station and a plurality of user equipments according to an embodiment as part of a communication system.

FIG. 3 shows a schematic diagram of an apparatus 301 according to an embodiment as part of a wireless communication system 300. The apparatus 301 is configured to manage the full-duplex communication between a base station $BS_0$ and a set of user equipments 101a,b, wherein the base station $BS_0$ comprises a plurality of transmitter antennas and a plurality of receiver antennas and wherein the plurality of transmitter antennas are associated with a downlink communication channel H between the base station $BS_0$ and the set of user equipments 101a,b and a plurality of interference channels $G_i$ between the base station $BS_0$ and a plurality of receiver antennas of a plurality of neighboring base stations $BS_i$. For the sake of clarity only one neighboring base station $BS_i$ is shown in FIG. 3. In an embodiment, the apparatus 301 can be implemented as a component of the base station $BS_0$.

The apparatus 301 comprises a determiner 303 configured to determine an aggregate interference channel G on the basis of the plurality of interference channels $G_i$. Moreover, the apparatus 301 comprises a modifier 305 configured to iteratively modify the aggregate interference channel G to obtain a modified aggregate interference channel F under the constraint that a performance measure depending on the downlink communication channel H and the modified aggregate interference channel F meets a performance measure criterion, wherein the modified aggregate interference channel F spans a subspace of the space spanned by the aggregate interference channel G. Moreover, the apparatus 301 comprises a precoder 307 configured to precode signals to be transmitted by the plurality of transmitter antennas on the basis of a precoder matrix W in order to mitigate the interference at least at some of the neighboring base stations, wherein the precoder matrix W depends on the modified aggregate interference channel F.

In an embodiment, the apparatus 301 further comprises a scheduler 309 configured to adjust the set of user equipments 101a,b served by the base station $BS_0$ on the basis of the modified aggregate interference channel F and/or the precoder matrix W.

Figure 4:
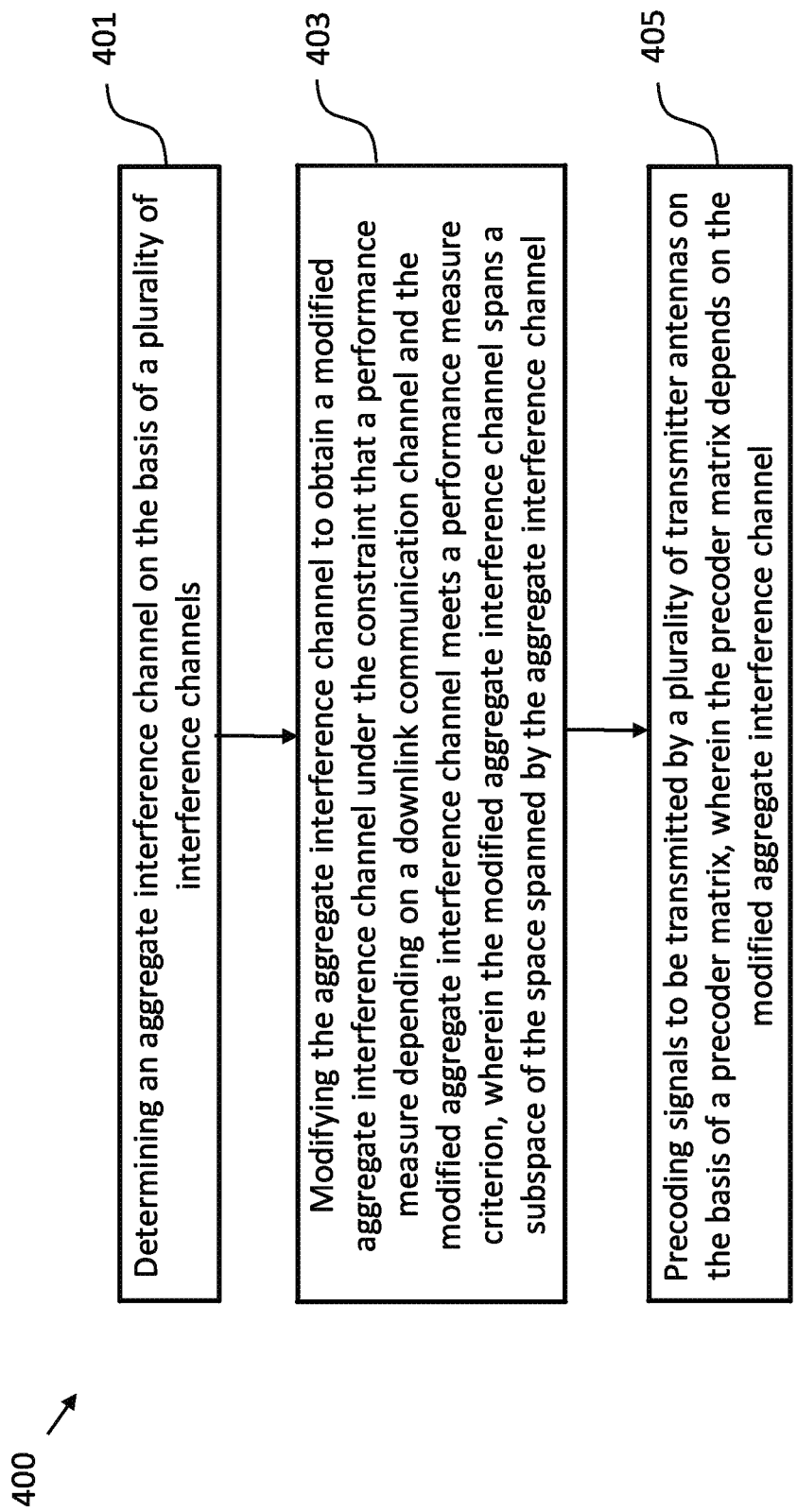
FIG. 4 shows a schematic diagram illustrating a method for managing full-duplex communication between a base station and a plurality of user equipments according to an embodiment.

FIG. 4 shows a schematic diagram of a method 400 for managing full-duplex communication between a base station $BS_0$ and a set of user equipments 101a,b, wherein the base station $BS_0$ comprises a plurality of transmitter antennas and a plurality of receiver antennas and wherein the plurality of transmitter antennas are associated with a downlink communication channel H between the base station $BS_0$ and the set of user equipments 101a,b and a plurality of interference channels $G_i$ between the base station $BS_0$ and a plurality of receiver antennas of a plurality of neighboring base stations $BS_i$.

The method 400 comprises a first step 401 of determining an aggregate interference channel G on the basis of the plurality of interference channels $G_i$. The method 400 comprises a further step 403 of modifying the aggregate interference channel G to obtain a modified aggregate interference channel F under the constraint that a performance measure depending on the downlink communication channel H and the modified aggregate interference channel F meets a performance measure criterion, wherein the modified aggregate interference channel F spans a subspace of the space spanned by the aggregate interference channel G. The method 400 comprises a further step 405 of precoding signals to be transmitted by the plurality of transmitter antennas on the basis of a precoder matrix W in order to mitigate the interference at least at some of the neighboring base stations, wherein the precoder matrix W depends on the modified aggregate interference channel F.

Further implementation forms, embodiments and aspects of the apparatus 301 and the method 400 will be described in the following, in particular embodiments, where the apparatus 301 is part of the base station $BS_0$ as shown, for instance, in FIG. 3. In other embodiments, the apparatus 301 can be a standalone unit in communication with the base station $BS_0$.

As already mentioned above, FIG. 3 shows a wireless communication network 300 comprising the apparatus 301 according to an embodiment, which is implemented as part of the base $BS_0$. One will appreciate that in other embodiments the apparatus 301 could be a standalone network entity in communication with the base station $BS_0$ and potentially other base stations $BS_i$ of the network 300 for centrally managing the full-duplex communication of these devices.

The wireless communication network 300 shown in FIG. 3 consists of a plurality of full-duplex massive MIMO base stations $\{BS_i\}$ having $M_i$ antennas each. In an embodiment, a base station $BS_i$ serves $K_i$ DL user equipments or users using $T_i = M_i^{(TX)} + M_i^{(TX/RX)}$ antennas out of its $M_i$ antenna elements, where $M_i^{(TX)}$ denotes the number of antennas exclusively used for transmission and $M_i^{(TX/RX)}$ denotes the number of antennas used simultaneously for transmission and reception purposes. Additionally, a base station $BS_i$ serves its UL user equipments or users using $T_i = M_i^{(RX)} + M_i^{(TX/RX)}$ antennas, where $M_i^{(RX)}$ denotes the number of antennas exclusively used for reception purposes. The users (or user equipments) served by a base station $BS_i$ can be either in full-duplex or half-duplex mode and a user in full-duplex mode can be both a DL user and an UL user at the same time and frequency.

In an embodiment, the base station $BS_0$ serves $K_0$ DL users (or user equipments) through the DL channel H of dimensions $K_0 \times T_0$ and $\text{rank}(H) = K_0$, while guaranteeing some individual performance measure, in particular, a quality-of-service (QoS) constraint for each user:

$$\text{QoS}_k(HW) \geq \gamma_k \tag{1}$$

wherein $\text{QoS}_k$ denotes a performance measure and $\gamma_k$ denotes a performance measure threshold for the k-th user equipment.

While serving its $K_0$ DL users, the base station $BS_0$ creates self-interference to its own UL users and to the UL users served by its neighboring base stations $\{BS_i\}_{i \in \mathcal{I}_0}$, where $\mathcal{I}_0$ is defined as the set containing the indices of the neighboring BSs of the base station $BS_0$. The matrix $G_0$ of dimensions $R_0 \times T_0$ describes the self-interfering channel at the base station $BS_0$ and the matrix $G_i$ of dimensions $R_i \times T_0$ describes the propagation channel between the base station $BS_0$ and its neighboring base station $BS_i$. In this case, the base station $BS_0$ creates interference in the aggregate interfering channel G defined as:

$$G^H = [G_0^H \; G_{\mathcal{I}_0(1)}^H \; G_{\mathcal{I}_0(2)}^H \; \ldots \; G_{\mathcal{I}_0(|\mathcal{I}_0|)}^H] \tag{2}$$

with dimensions $(R_0 + \Sigma_{i \in \mathcal{I}_0} R_i) \times T_0$.

Since the base station $BS_0$ only uses $K_0$ degrees of freedom to serve its DL users, there are still $T_0 - K_0$ excess antennas which can be used as $E_0 \leq T_0 - K_0$ extra degrees of freedom to mitigate its own self-interference and also to mitigate the inter-cell interference created to its neighboring base stations. However, in the most general scenario, the number of the available extra degrees of freedom $E_0$ might not be large enough to completely cancel the aggregate interfering channel G. In that case, the base station $BS_0$ comprising the apparatus 301 can identify the spatial components (directions) that are creating the most harmful interference and that can be mitigated while still guaranteeing the QoS constraints of the DL users.

In an embodiment, these directions are identified by the apparatus 301 using a matrix F, which is obtained from G, optionally using information provided by neighboring base stations $BS_i$. Since F is obtained from G, the matrix F is referred to herein as the final or modified aggregate interfering channel.

Under reference to FIG. 5, aspects of an embodiment of the apparatus 301 as part of the base station $BS_i$, that is configured to serve its DL users and mitigate its self-interference and the inter-cell interference created at its neighboring base stations by exploiting the extra degrees of freedom resulting from the excess antennas of its massive MIMO array, will be described in the following.

Figure 6:
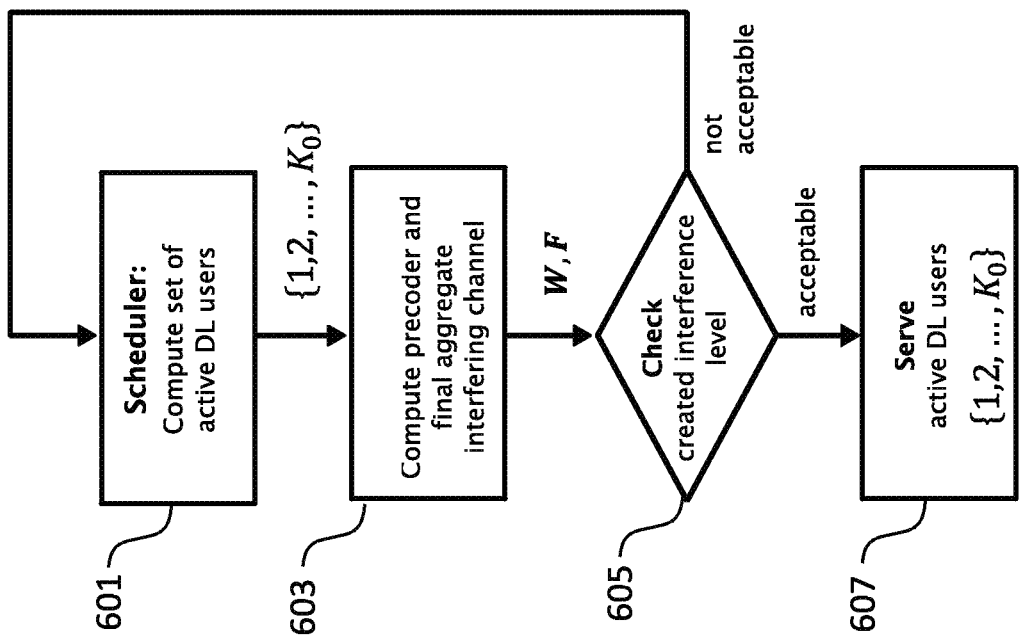
FIG. 6 shows a schematic diagram illustrating different aspects of an apparatus for managing full-duplex communication between a base station and a plurality of user equipments according to an embodiment.

In an embodiment, the number and/or the set of active DL users $\{1, 2, \ldots, K_0\}$ can have been previously fixed by a scheduler 309 of the apparatus 301 or a higher-layer processing unit. For instance, in an embodiment, this set could be updated by the scheduler 309 on the basis of the output of the modifier 305 and/or the precoder 307 of the apparatus 301 in order to obtain the best combination of feasible set of DL users and a desired interference mitigation level. Such an embodiment is shown in FIG. 6. The scheduler 309 determines the set of active DL users $\{1, 2, \ldots, K_0\}$ (in block 601 in FIG. 6) and provides this set to the modifier 305. On the basis of this set of active DL users the precoder 307 determines the precoder matrix W on the basis of the modified aggregate interference channel (block 603 in FIG. 6). The apparatus 301 is configured to check whether the interference level associated with this precoder matrix W is acceptable or not (block 605 in FIG. 6). If this is the case, the apparatus 301 will serve the set of active DL users $\{1, 2, \ldots, K_0\}$ (block 607 in FIG. 6). Otherwise, the scheduler 309 will determine a modified set of active DL users.

Figure 7:
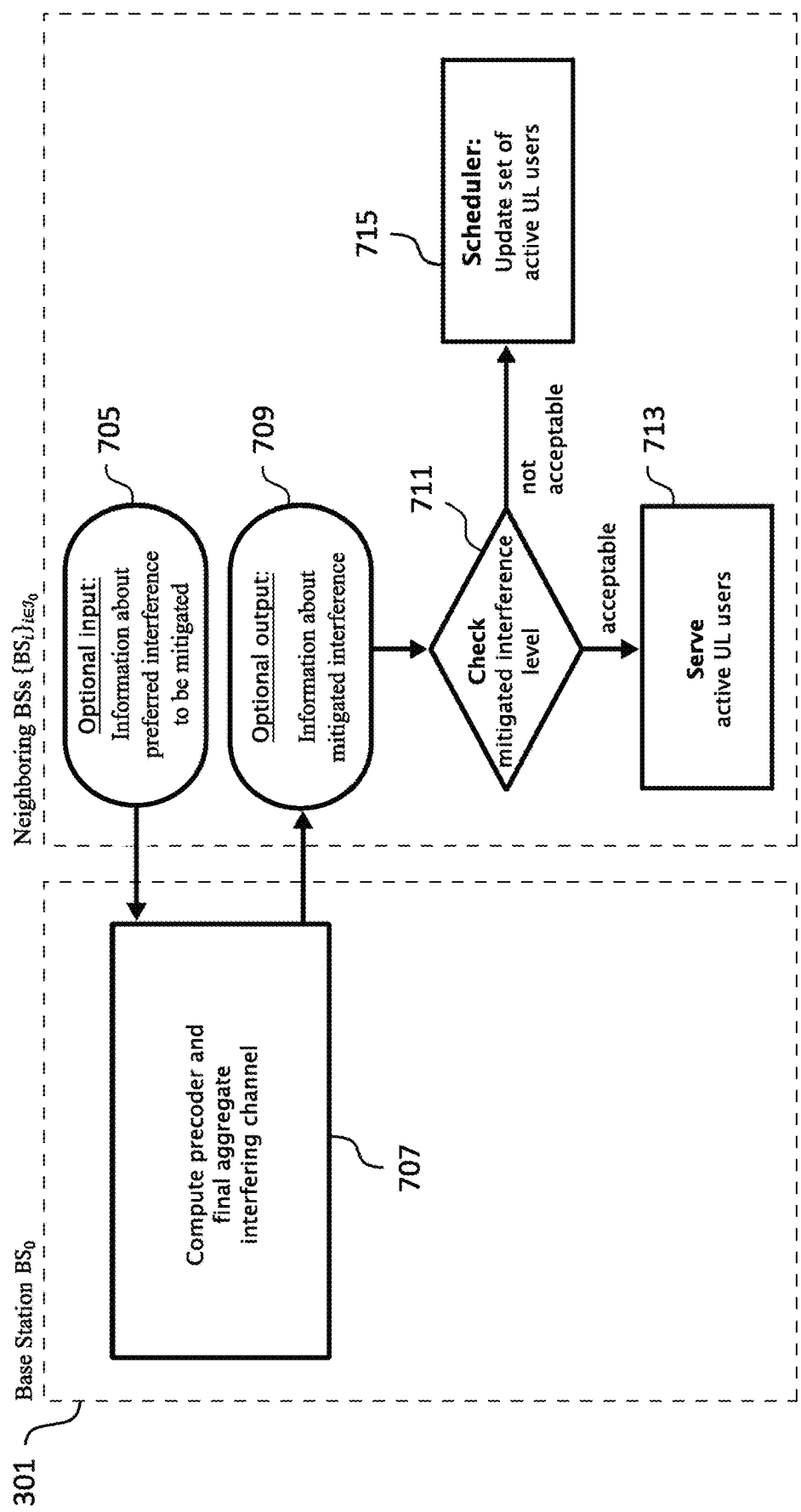
FIG. 7 shows a schematic diagram illustrating different aspects of an apparatus for managing full-duplex communication between a base station and a plurality of user equipments according to an embodiment.

In an embodiment, the output information about mitigated interference can be exploited by the neighboring base stations $BS_i$ to update their respective sets of UL users. Such an embodiment is illustrated in FIG. 7. In an embodiment, the neighboring base stations $BS_i$ can provide the apparatus 301, in particular the modifier 305, implemented as a component of the base station $BS_0$, with information about the preferred interference to be mitigated (block 705 in FIG. 7). In an embodiment, the apparatus 301 is configured to provide the final modified aggregate interference channel F to the the neighboring base stations $BS_i$ (blocks 707 and 709 of FIG. 7). On the basis of this information the neighboring base stations $BS_i$ can check whether the mitigated interference level is acceptable or not (block 711 of FIG. 7). If this is the case, the respective neighboring base station $BS_i$ can start serving its active UL users (block 715 of FIG. 7). Otherwise, a scheduler of the respective neighboring base station $BS_i$ can update its set of active UL users (block 715 of FIG. 7).

Referring back to FIG. 5, in an embodiment, the determiner 303 of the apparatus 301 is configured to compute the initial aggregate interfering channel G(0) on the basis of the set of neighboring base stations $\mathcal{I}_0 = \{\mathcal{I}_0(1), \mathcal{I}_0(2), \ldots, \mathcal{I}_0(|\mathcal{I}_0|)\}$, the interfering channels from the base station $BS_0$ to the neighboring base stations in $\mathcal{I}_0$, i.e., $\{G_i\}_{i \in \mathcal{I}_0}$, and the self-interference channel $G_0$ as follows (blocks 501 and 503 of FIG. 5):

$$G(0)^H = [G_0^H \; G_{\mathcal{I}_0(1)}^H \; G_{\mathcal{I}_0(2)}^H \ldots \; G_{\mathcal{I}_0(|\mathcal{I}_0|)}^H]. \tag{3}$$

In an embodiment, the self-interference channel $G_0$ can be an equivalent channel depending on the underlying self-interference cancelling approach that is used. For example, when the full-duplex operation uses analog cancellation or antenna isolation, it has been shown that the resulting dominant paths are a function of the type of analog canceller and isolation mechanism. Consequently, in an embodiment the base station $BS_0$ may choose to use the self-interference channel $G_0$ as the equivalent channel after applying analog cancellation and isolation.

Similarly, $G_0$ and $\{G_i\}_{i \in \mathcal{J}_0}$ do not have to represent necessarily a physical propagation channel. For instance, they can be unitary matrices describing the associated individual interfering subspaces.

Equation (3) is in a very general form and embodiments of the invention implement the following simplifications thereof. If the self-interference is successfully managed at the antenna isolation and the analog canceller level, then in an embodiment the apparatus 301, implemented as component of the base station $BS_0$, may choose not to include the self-interference channel $G_0$ in the calculation of the initial aggregate interfering channel G(0). If the interference generated to one of the neighboring co-channel base station, say $BS_j$ is weak, then in an embodiment the apparatus 301 implemented as component of the base station $BS_0$ may choose not to include the corresponding $G_j$ in the calculation of G(0) or, equivalently, remove j from the set $\mathcal{J}_0$. If $G_0$ and $\{G_i\}_{i \in \mathcal{J}_0}$ contain information about the underlying interfering subspaces, the operation in equation (3), must be understood as taking the union of all these interfering subspaces.

Figure 5:
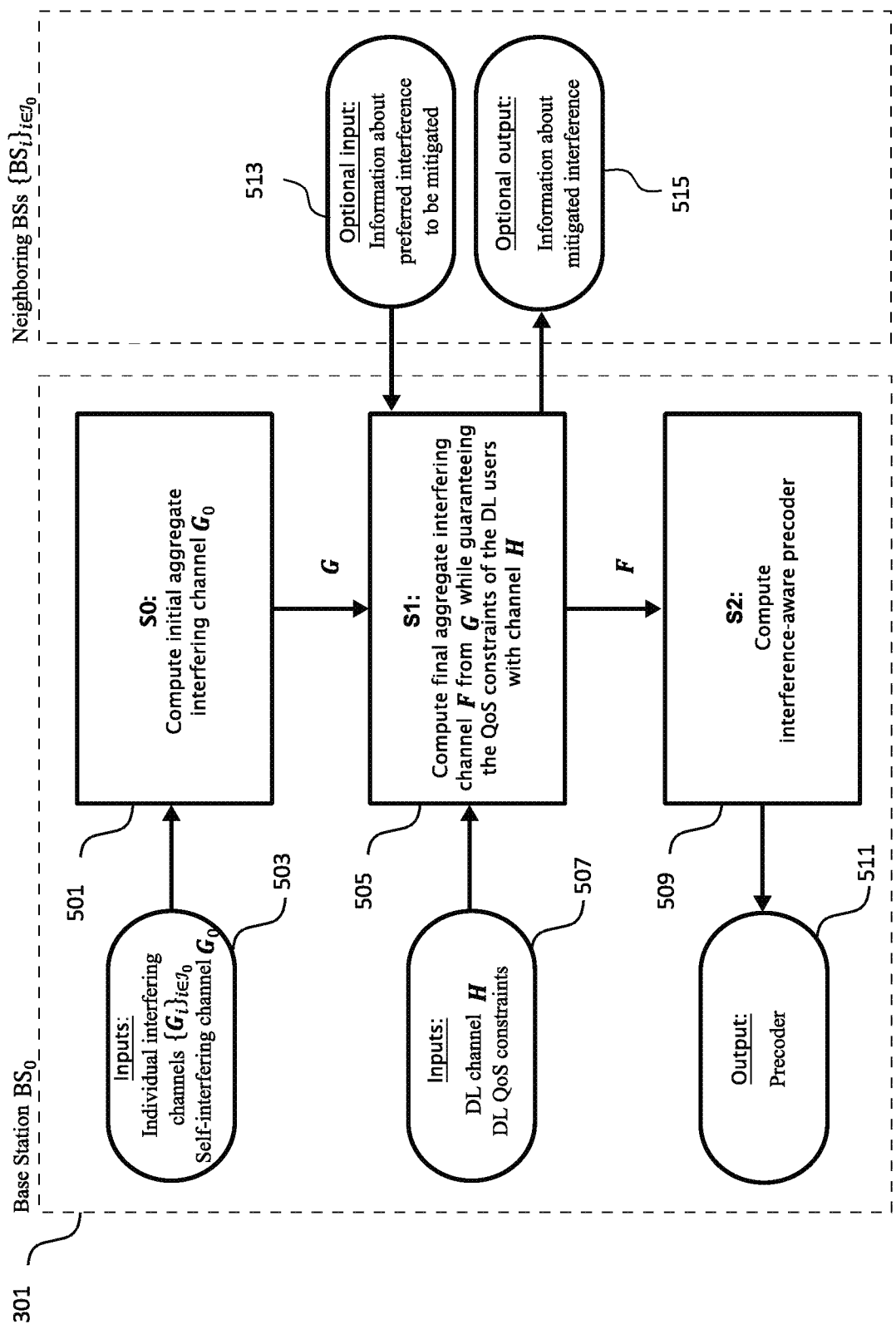
FIG. 5 shows a schematic diagram illustrating different aspects of an apparatus for managing full-duplex communication between a base station and a plurality of user equipments according to an embodiment.
Figure 8:
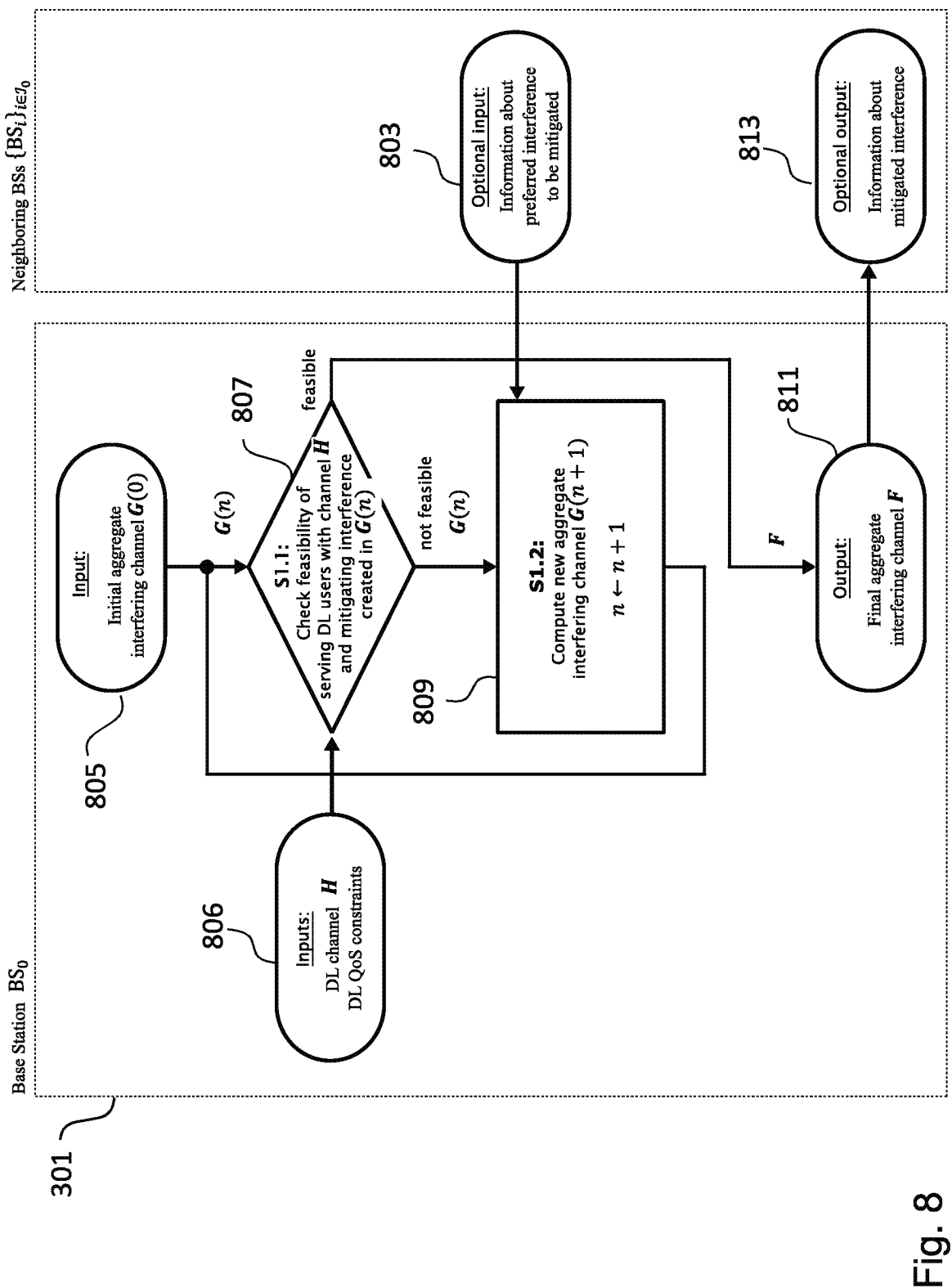
FIG. 8 shows a schematic diagram illustrating different aspects of an apparatus for managing full-duplex communication between a base station and a plurality of user equipments according to an embodiment.

FIG. 8 shows in more detail a possible implementation of the block 505 shown in FIG. 5 in the apparatus 301 according to an embodiment implemented as component of the base station $BS_0$, namely an implementation of the modifier 305 configured to iteratively obtain the final aggregate interfering channel F to be mitigated, given the DL channel H and the DL QoS constraints (block 806 of FIG. 8), the initial aggregate interfering channel G(0) (block 805 of FIG. 8), and possibly some information about interference mitigation preferences provided by the neighboring base stations $\{BS_i\}_{i \in \mathcal{J}_0}$ (block 803 of FIG. 8).

Given the DL channel H between the base station $BS_0$ and its DL users and the current aggregate interfering channel G(n), the apparatus 301 checks in block 807 the feasibility of constructing the precoder matrix W which guarantees the required quality of service constraints of the DL users while controlling the interference created through G(n) under some interference mitigation criterion. If this is feasible, the current aggregate interfering channel G(n) will be used as final aggregate interfering channel F (block 811 of FIG. 8). Otherwise, the current aggregate interfering channel G(n) will be updated (block 809 of FIG. 8). Optionally, information about the final aggregate interfering channel F and, thus, the mitigated interference can be provided to the neighboring base stations $\{BS_i\}_{i \in \mathcal{J}_0}$ (block 813 of FIG. 8).

In an embodiment, the modifier 305 of the apparatus 301 is configured to iteratively obtain in block 809 of FIG. 8 the new aggregate interfering channel G(n+1) on the basis of the DL channel H between the base station $BS_0$ and its DL users and the current aggregate interfering channel G(n) by restricting it to span a subspace of the original space spanned by G(n).

As already described above, in FIG. 5 and FIG. 8 there is an optional exchange of information between the base station $BS_0$ and its neighboring base stations $\{BS_i\}_{i \in \mathcal{J}_0}$ (blocks 513 and 515 in FIG. 5 and blocks 803 and 813 in FIG. 8). Some exemplary embodiments of what this type of information can be are described in the following.

If the neighboring base stations $\{BS_i\}_{i \in \mathcal{J}_0}$ are performing specific interference management techniques, in an embodiment some information related to these operations can be shared with the base station $BS_0$, so that this information can be used by the apparatus 301 implemented as a component of the base station $BS_0$ when calculating the final aggregate interfering channel F. If the neighboring base stations $\{BS_i\}_{i \in \mathcal{J}_0}$ have certain preferences regarding certain interfering subspaces to be mitigated, in an embodiment this information can be shared with the base station $BS_0$, for example, in the form of a set of vectors spanning such a subspace. If the neighboring base stations $\{BS_i\}_{i \in \mathcal{J}_0}$ want to avoid the interference in a subset of their receiver antennas, in an embodiment this information can be shared with the base station $BS_0$, for example, in the form of an ordered set of indices identifying the corresponding antennas.

If the final aggregated interfering channel F was obtained from a codebook, then in an embodiment the base station $BS_0$ can share with its neighboring base stations the codebook index corresponding to the resulting final aggregated interfering channel H. In an embodiment the base station $BS_0$ can also share with its neighboring base stations $\{BS_i\}_{i \in \mathcal{J}_0}$ information about span(F), i.e., information about the mitigated interfering subspace. If the final aggregated interfering channel F was obtained by removing rows from the initial interfering channel G(0), then in an embodiment the base station $BS_0$ can share with its neighboring base stations $\{BS_i\}_{i \in \mathcal{J}_0}$ the indices of the rows of $G_i$ that have been removed.

According to embodiments of the invention, all the optional outputs of the base station $BS_0$ in block 505 in FIG. 5 can be inputs to a corresponding block of a neighboring base station $BS_j$ and vice versa.

In an embodiment, the apparatus 301 implemented as a component of the base station $BS_0$ comprises a precoder 307 in the form of a zero-forcing (ZF) precoder to serve its $K_0$ DL users. In an embodiment, the extra degrees of freedom $E_0 \leq T_0 - K_0$ are exploited in order to mitigate the inter-cell interference created at the neighboring base stations $\{BS_i\}_{i \in \mathcal{J}_0}$ by computing the ZF precoder matrix W of dimensions $T_0 \times K_0$ as follows:

$$W = \kappa \text{pinv}(H(I - F^H \text{pinv}(FF^H)F)), \quad (4)$$

where F is the final aggregate interfering channel obtained from the aggregate interfering channel G such that:

$$\text{rank}(F) \leq E_0 \text{ and} \quad (5)$$

$$\text{QoS}_k(\kappa H \text{pinv}(H(I - F^H \text{pinv}(FF^H)F))) \geq \gamma_k, k=1,2,\ldots,K_0. \quad (6)$$

The precoder matrix W computed on the basis of equation (4) constitutes a possible embodiment for the block 509 shown in FIG. 5.

Figure 9:
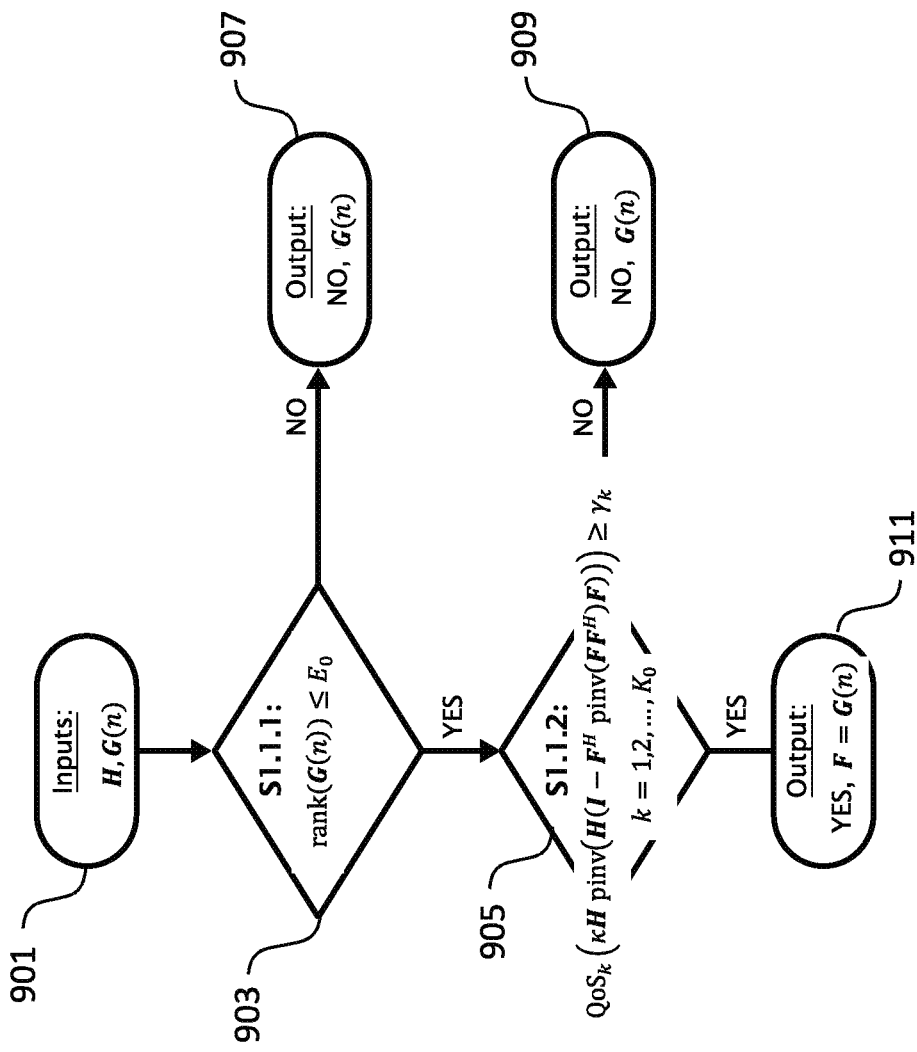
FIG. 9 shows a schematic diagram illustrating different aspects of an apparatus for managing full-duplex communication between a base station and a plurality of user equipments according to an embodiment.

In the following, further possible implementations of the block 807 of FIG. 8 will be described for the case of a ZF precoder 307 under further reference to FIG. 9. Given the channel H and the current aggregated interfering channel G(n) as inputs (block 901 of FIG. 9), the apparatus 301 is configured to check whether the conditions defined by equations (5) and (6) are met (blocks 903 and 905 of FIG. 9). If these conditions are met, the current aggregated interfering channel G(n) is provided as the final aggregated interfering channel F (block 911 of FIG. 9). Otherwise, the current aggregated interfering channel G(n) has to be further modified (blocks 907 and 909 of FIG. 9).

In the following, further possible implementations of the block 809 of FIG. 8 will be described for the case of a ZF precoder 307 under further reference to FIGS. 10 and 11. The specific procedure to compute G(n+1) from G(n) depends on the information about the preferred interference to be mitigated reported to the base station $BS_0$ by its neighboring base stations $\{BS_i\}_{i \in \mathcal{J}_0}$.

Figure 10:
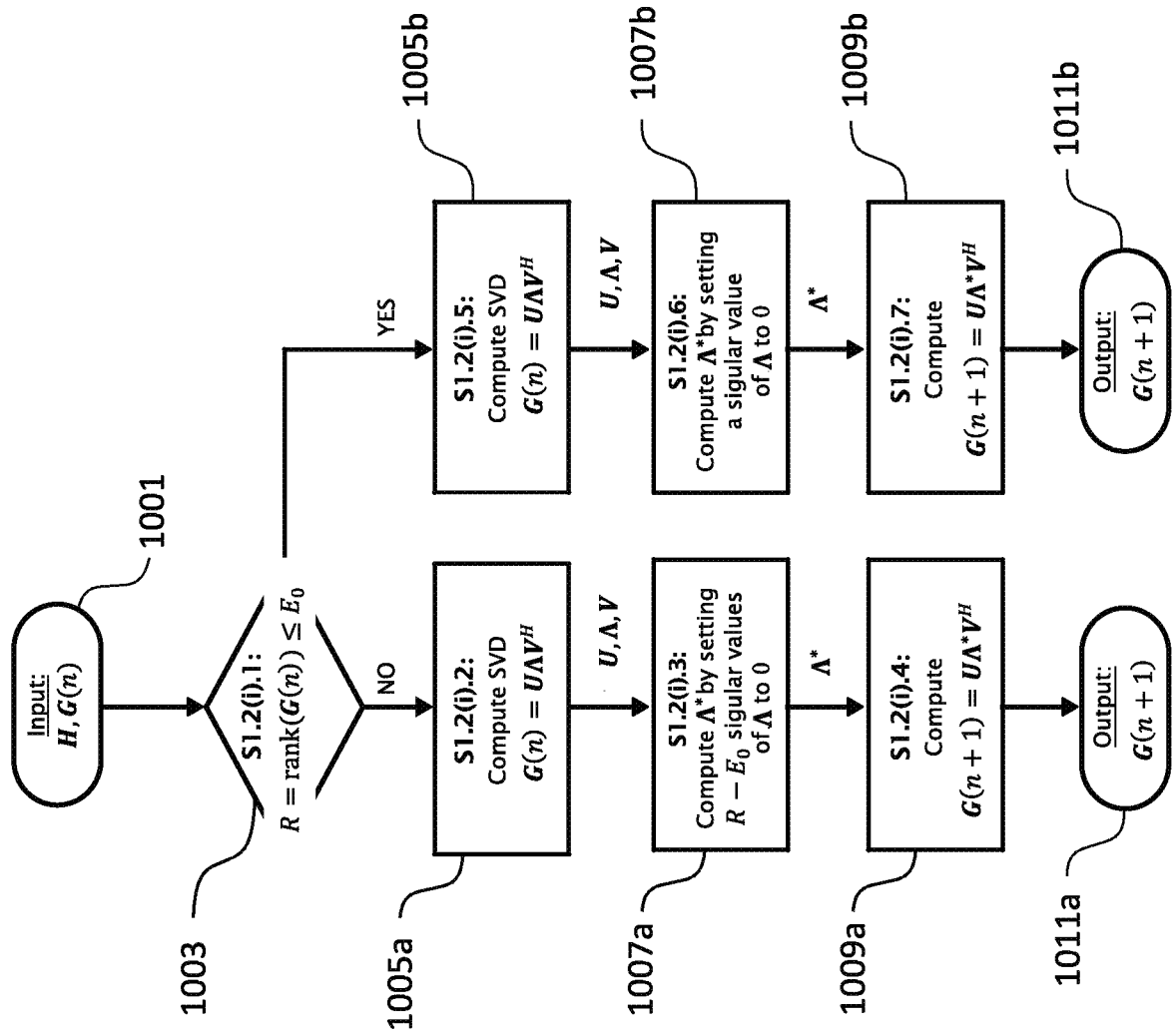
FIG. 10 shows a schematic diagram illustrating different aspects of an apparatus for managing full-duplex communication between a base station and a plurality of user equipments according to an embodiment.

FIG. 10 shows further possible implementations of the block 809 of FIG. 8 for the case that no information from the neighboring base stations $\{BS_i\}_{i \in J_0}$ about the preferred interference to be mitigated is available to the base station $BS_0$. Given the channel H and the current aggregated interfering channel G(n) as inputs (block 1001 of FIG. 10), the apparatus 301 checks whether the condition defined by equation (5) is met (block 1003 of FIG. 10). In block 1005a or alternatively block 1005b of FIG. 10 the dimension of the subspace spanned by the aggregate interfering channel G(n) is reduced by resorting to its singular value decomposition. Then, G(n+1) results from removing the weakest interfering directions from G(n) and/or the interfering directions in G(n) that are the most aligned to the DL channel H (blocks 1007a, 1009a, 1011a or alternatively blocks 1007b, 1009b, 1011b of FIG. 10).

Thus, in an embodiment the modifier 305 is configured to modify the aggregate interference channel G to obtain the modified aggregate interference channel F by determining a singular value decomposition of the aggregate interference channel G of the form $G = U\Lambda V^H$ comprising a diagonal matrix $\Lambda$, modifying, e.g. reducing, at least one of the singular values of the diagonal matrix $\Lambda$ to obtain a modified diagonal matrix $\Lambda^*$, and by determining the modified aggregate interference channel F as $F = U\Lambda^* V^H$.

Figure 11:
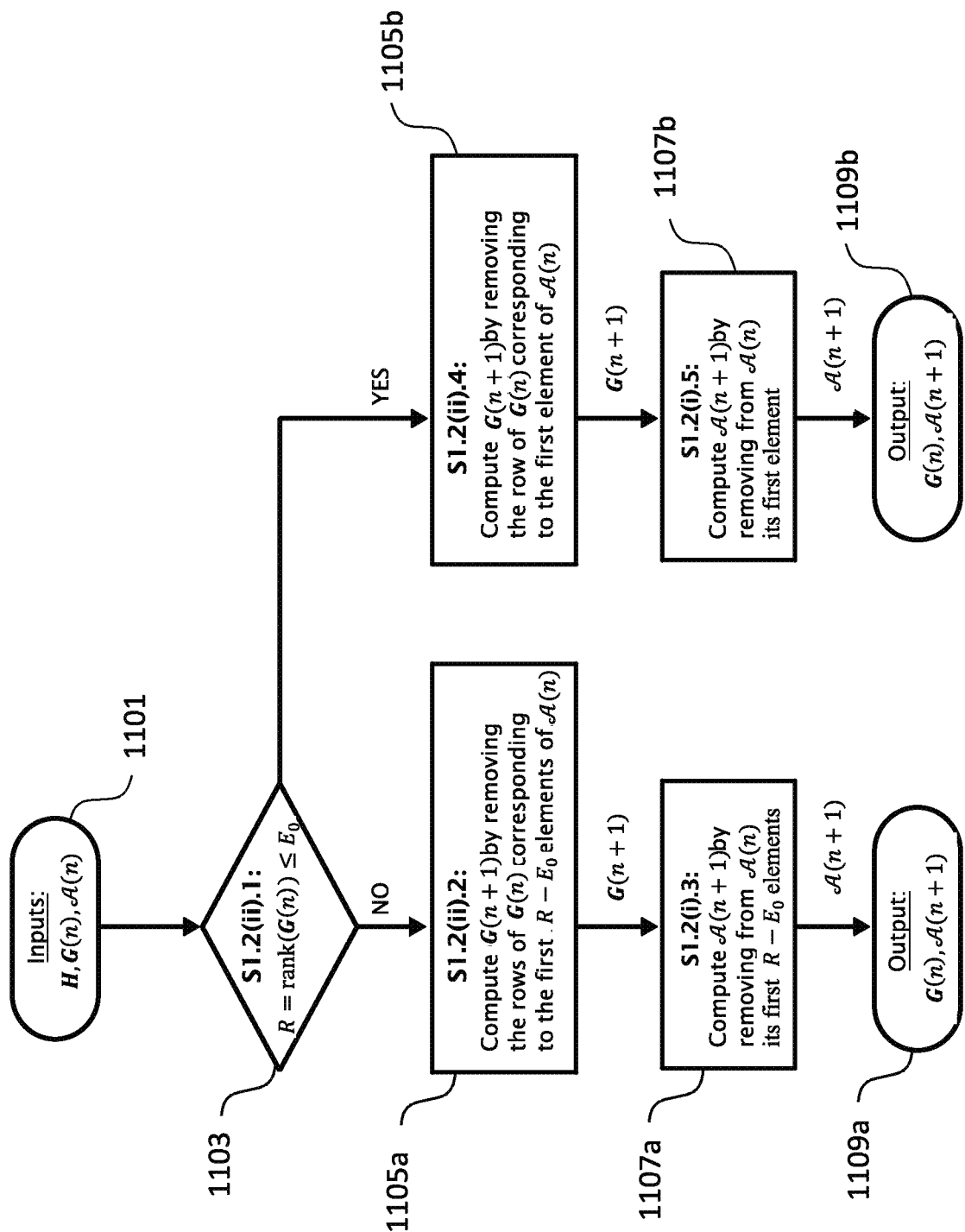
FIG. 11 shows a schematic diagram illustrating different aspects of an apparatus for managing full-duplex communication between a base station and a plurality of user equipments according to an embodiment.

FIG. 11 shows further possible implementations of the block 809 of FIG. 8 for the case that at least one, preferably several neighboring base station(s) $BS_i$, provides to the base station $BS_0$ information in the form of a set(s) $\mathcal{A}_i$ identifying the antenna elements of the neighboring base station(s) $BS_i$, whose interference should be cancelled. Assuming that the sets $\{\mathcal{A}_i\}_{i \in J_0}$ are sorted in decreasing order of preference, the apparatus 301 implemented as a component of the base station $BS_0$ can calculate the initial ordered interference-free antenna set $\mathcal{A}(0)$ including all elements of $\{\mathcal{A}_i\}_{i \in J_0}$. Let $\mathcal{A}(n)$ denote the ordered interference-free antenna set, given that the interference created through G(n) is cancelled. Given the channel H and the current aggregated interfering channel G(n) as inputs (block 1101 of FIG. 11), the apparatus 301 checks whether the condition defined by equation (5) is met (block 1103 of FIG. 11). Then, G(n+1) is obtained by removing from G(n) the row corresponding to the $T_0 \times 1$ channel connecting the $T_0$ transmit antennas of the base station $BS_0$ to the $a_i$-th antenna element of the neighboring base station $BS_i$, with $a_i$ being the first element in $\mathcal{A}(n)$ (blocks 1105a, 1109a or alternatively blocks 1105b, 1109b of FIG. 11). The interference-free antenna set is updated as $\mathcal{A}(n+1) = \mathcal{A}(n) \setminus \{a_i\}$ (blocks 1107a, 1109a or alternatively blocks 1107b, 1109b of FIG. 11).

Embodiments of the invention provide, in particular, for the following advantages. Embodiments of the invention allow dealing with the following two types of interference which result from full-duplex operation: (i) inter-cell interference between base stations, and (ii) self-interference at a base station. By identifying the interference directions and the downlink user directions, embodiments of the invention are capable of performing interference mitigation while targeting no detrimental effect to the DL users. Embodiments of the invention are flexible in the sense that (i) different types of precoders can be applied, (ii) the input of different kinds of information regarding the interference of the network is possible (e.g. information about preferred interference to be mitigated), and (iii) different kinds of information regarding the interference created in the network can be provided (e.g. information about mitigated interference). The final aggregate interfering channel that is computed by embodiments of the invention can be used by the system scheduler in order to update the set of served downlink users. Moreover, the information about mitigated interference can be used by the schedulers of neighboring full-duplex base stations in order to update their respective sets of served uplink users.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An apparatus for managing full-duplex communication between a base station and a set of user equipment, the base station comprising a plurality of transmitter antennas, the plurality of transmitter antennas being associated with a downlink communication channel H between the base station and the set of user equipment and a plurality of interference channels $G_i$ between the base station and a plurality of neighboring base stations, the apparatus comprising a processor and a memory coupled to the processor to store instructions, which when executed by the processor, cause the processor to perform operations, the operations comprising:

determining an aggregate interference channel G on the basis of the plurality of interference channels $G_i$;

modifying the aggregate interference channel G to obtain a modified aggregate interference channel F under a constraint that a performance measure depending on the downlink communication channel H and the modified aggregate interference channel F meets a performance measure criterion, wherein the modified aggregate interference channel F spans a subspace of a space spanned by the aggregate interference channel G; and precoding signals to be transmitted by the plurality of transmitter antennas on the basis of a precoder matrix W, wherein the precoder matrix W depends on the modified aggregate interference channel F;

wherein modifying the aggregate interference channel G to obtain the modified aggregate interference channel F comprises removing at least one column or row of the aggregate interference channel G that is most aligned to a space spanned by the downlink communication channel H.

2. The apparatus of claim 1, wherein the aggregate interference channel G is determined further on the basis of a self-interference channel $G_O$ between the plurality of transmitter antennas and a plurality of receiver antennas of the base station.

3. The apparatus of claim 1, wherein the operations further comprise: adjusting a degree of orthogonality to a space spanned by the modified aggregate interference channel F on the basis of a parameter associated with noise and/or interference level.

4. The apparatus of claim 1, wherein the precoder matrix W depends on the modified aggregate interference channel F in such a way that a space spanned by the precoder matrix W is orthogonal to a space spanned by the modified aggregate interference channel F.

5. The apparatus of claim 1, wherein the performance measure criterion comprises a performance measure criterion for each user equipment of the set of user equipment, wherein each performance measure criterion is defined by a following equation:

$$QoS_k(HW) \geq \gamma_k,$$

wherein $QoS_k$ denotes a performance measure and $\gamma_k$ denotes a performance measure threshold for k-th user equipment of the set of user equipment.

6. The apparatus of claim 1, wherein modifying the aggregate interference channel G to obtain the modified aggregate interference channel F comprises: determining a singular value decomposition of the aggregate interference channel G of a form $G=U\Lambda V^H$ comprising a diagonal matrix $\Lambda$, modifying at least one of singular values of the diagonal matrix $\Lambda$ to obtain a modified diagonal matrix $\Lambda^*$, and determining the modified aggregate interference channel F as $F=U\Lambda^*V^H$, wherein U is a first unitary matrix, V is a second unitary matrix.

7. The apparatus of claim 1, wherein the aggregate interference channel G to obtain the modified aggregate interference channel F is modified on the basis of information provided by at least one neighboring base station of the plurality of neighboring base stations.

8. The apparatus of claim 7, wherein the information provided by the at least one neighboring base station of the plurality of neighboring base stations comprises information identifying at least one receiver antenna of the at least one neighboring base station of the plurality of neighboring base stations for which interference is mitigated.

9. The apparatus of claim 8, wherein modifying the aggregate interference channel G to obtain the modified aggregate interference channel F comprises: removing a row or column of the aggregate interference channel 6 associated with the identified receiver antenna of the at least one neighboring base station of the plurality of neighboring base stations for which interference is mitigated.

10. The apparatus of claim 1, wherein the operations further comprise: adjusting the set of user equipment served by the base station on the basis of the modified aggregate interference channel F and/or the precoder matrix W.

11. The apparatus of claim 1, wherein the operations further comprise: providing information about the modified aggregate interference channel F to at least one neighboring base station of the plurality of neighboring base stations.

12. A base station comprising an apparatus having a processor and a memory coupled to the processor to store instructions, which when executed by the processor, cause the processor to perform operations, the operations comprising:

determining an aggregate interference channel G on the basis of a plurality of interference channels $G_i$ between the base station and a plurality of neighboring base stations;

modifying the aggregate interference channel G to obtain a modified aggregate interference channel F under a constraint that a performance measure depending on a downlink communication channel H between the base station and a set of user equipment, and the modified aggregate interference channel F meets a performance measure criterion, wherein the modified aggregate interference channel F spans a subspace of a space spanned by the aggregate interference channel G; and precoding signals to be transmitted by a plurality of transmitter antennas of the base station on the basis of a precoder matrix W, wherein the precoder matrix W depends on the modified aggregate interference channel F;

wherein modifying the aggregate interference channel G to obtain the modified aggregate interference channel F comprises removing at least one column or row of the aggregate interference channel G that is most aligned to a space spanned by the downlink communication channel H.

13. A method for managing full-duplex communication between a base station and a set of user equipment, the base station comprising a plurality of transmitter antennas, the plurality of transmitter antennas being associated with a downlink communication channel H between the base station and the set of user equipment and a plurality of interference channels $G_i$ between the base station and a plurality of neighboring base stations, the method comprising:

determining an aggregate interference channel G on the basis of the plurality of interference channels $G_i$;

modifying the aggregate interference channel G to obtain a modified aggregate interference channel F under a constraint that a performance measure depending on the downlink communication channel H and the modified aggregate interference channel F meets a performance measure criterion by removing at least one column or row of the aggregate interference channel G that is most aligned to a space spanned by the downlink communication channel H, wherein the modified aggregate interference channel F spans a subspace of a space spanned by the aggregate interference channel G; and precoding signals to be transmitted by the plurality of transmitter antennas on the basis of a precoder matrix W, wherein the precoder matrix W depends on the modified aggregate interference channel F.

14. A non-transitory computer readable medium comprising program codes for performing the method of claim 13 when the program codes are executed on a computer.

* * * * *